United States Patent [19]

Goldman

[11] 4,452,943
[45] * Jun. 5, 1984

[54] THERMOFORMING OF THERMOPLASTIC POLYMERS

[76] Inventor: Conrad Goldman, P.O. Box 7033, Hicksville, N.Y. 11802

[*] Notice: The portion of the term of this patent subsequent to Mar. 5, 1996 has been disclaimed.

[21] Appl. No.: 433,688

[22] Filed: Jan. 16, 1974

Related U.S. Application Data

[63] Continuation of Ser. No. 179,540, Sep. 10, 1971, abandoned, which is a continuation-in-part of Ser. No. 792,933, Jan. 22, 1969, abandoned, and Ser. No. 793,751, Jan. 24, 1969, Pat. No. 3,624,189.

[51] Int. Cl.$^3$ .................. C08L 45/07; C08L 33/04
[52] U.S. Cl. .................. 525/105; 219/10.53; 525/106; 525/233; 525/236; 525/238; 525/240; 525/241
[58] Field of Search ............... 260/887, 889; 525/233, 525/191, 105, 106, 236, 238

[56] References Cited

U.S. PATENT DOCUMENTS

| | | | |
|---|---|---|---|
| 2,612,480 | 9/1952 | May | 260/889 |
| 2,927,904 | 3/1960 | Cooper | 260/889 |
| 3,179,718 | 4/1965 | Wei et al. | 260/889 |
| 3,624,189 | 11/1971 | Goldman | 260/876 R |

FOREIGN PATENT DOCUMENTS 1238881  7/1971  United Kingdom ............... 525/191

*Primary Examiner*—J. Ziegler
*Attorney, Agent, or Firm*—Fred L. Denson

[57] ABSTRACT

A process for dielectrically heating and thermoforming a non-polar thermoplastic material by electromagnetic field energy is accomplished by the addition of a polar domain-containing material having at least one nitrile group to the thermoplastic material. Compositions comprising thermoplastic material and a polar domain containing material useful in this process are also described.

20 Claims, 12 Drawing Figures

CROSS FIELD ELECTRODES    STRAY FIELD ELECTRODES

THERMOFORMING OF THERMOPLASTIC POLYMERS

This application is a continuation of application Ser. No. 179,540, filed Sept. 10, 1971 abandoned, which is a continuation-in-part of Ser. No. 792,933, filed Jan. 22, 1969 by Conrad Goldman now abandoned and Ser. No. 793,751 filed Jan. 24, 1969 by Conrad Goldman, and now U.S. Pat. No. 3,624,189 issued May 20, 1973.

This invention relates in general to the thermoforming of thermoplastic materials and more particularly to thermoformable compositions and to methods for dielectrically heating such compositions by electromagnetic field energy.

In thermoforming of thin gauge plastic materials, infrared units have been employed to soften the materials before forming is accomplished. Use of hot air ovens, heating on two sides, and other modifications of heating techniques have been employed to obtain reasonable heating rates and uniform heating. Since plastics, in general, are materials of relatively low thermal conductivity, heating is restricted to thin gauges for economic reasons. Radio frequency heating is much less favorable for thin gauge materials since substantial thermal energy is lost by radiation, conduction, etc.

Thick thermoplastic sections generally do not heat uniformly and thoroughly in a short time with infrared heat or hot air systems. While radio frequency energy is capable of rapid, thorough and uniform heating for certain materials, most common thermoplastic materials cannot be heated to thermoforming temperature by radio frequency energy.

The non-responsiveness of most thermoplastic polymers to radio frequency heating is generally due to their non-polar character. Non-polar materials do not respond to dielectric heating. Many thermoplastic polymeric materials which contain polar groups do not significantly respond to dielectric heating because frequently the polar groups either are arranged symmetrically, are bound by electron forces of other groups or are immobilized by cross linking effects.

It is, therefore, an object of this invention to provide improved methods for heat processing thin and thick gauge thermoplastic materials by electromagnetic field energy.

It is another object to provide thermoplastic compositions which are capable of being heated by electromagnetic field energy.

A further object of this invention is to provide a process for making thermoplastic materials which are capable of being heated by electromagnetic field energy.

Another object of this invention is to provide a process for rapidly and uniformly heating thick and thin thermoplastic materials by electromagnetic field energy without significantly affecting the physical properties of the material.

These and other objects of the invention are accomplished by admixing a thermoplastic polymer with a minor amount of a polar domain containing material having at least one nitrile group and dielectrically heating the admixture by subjecting it to electromagnetic field energy.

According to the invention, thermoplastic polymers which are normally non-responsive to heating by electromagnetic field energy become very responsive upon the addition of the polar domain containing material. A distinct advantage of this invention is that modified polymeric compositions can be rapidly and uniformly heated throughout without significant changes in physical properties. Thick sections, which previously could not be readily heated to thermoforming temperatures without either a degradation of the polymer itself or some other significant change in physical properties, can according to the present invention be uniformly and rapidly heated to high temperatures without affecting physical properties.

The polar domain containing material can be a simple organic compound containing a nitrile group or may be a polymeric material containing a nitrile group. Admixture of the polar domain containing material can be accomplished before, during or after polymerization of the thermoplastic polymer.

After the polar domain containing material is admixed with the thermoplastic polymer, the admixture is subjected to electromagnetic radiation causing the material to be rapidly heated. While the material can be heated to any desired temperature by increasing or decreasing the time of exposure to electromagnetic radiation, most applications require that the material be heated to its softening temperature, i.e., the temperature at which the material deforms without pressure, or to its thermoforming temperature, i.e. the temperature at which the material deforms with the application of pressure (five psi or more).

Depending on the composition of the admixture, various forms of electromagnetic field energy can be utilized for heating, the most frequently used form being radio frequency energy between 1 mc and 2750 mc and preferably between 1 mc and 140 mc, and more preferably between about 1 mc and 100 mc. Generally, higher frequencies cause more rapid heating.

A minor amount (i.e., less than 50% by weight) of the polar domain material is required to produce the unexpected results of the invention. The preferred amount by weight of this material in the admixture, however, ranges from about 1% to about 20%.

The nitrile group content of the polar domain containing material is not particularly significant so long as the material contains at least one nitrile group. Particularly improved results are obtained when the nitrile group content is at least 14.7% by weight.

As mentioned previously, the polar domain materials may be simple compounds or polymeric materials. Mixtures of polar domain materials may be readily employed. Preferred simple compounds have the structure:

wherein:
R is
(1) an alkyl group having 1 to 18 carbon atoms e.g., methyl, ethyl, propyl, butyl, isobutyl, octyl, dodecyl, etc. including a substituted alkyl group having 1 to 18 carbon atoms such as
  (a) alkoxyalkyl e.g. ethoxypropyl, methoxybutyl, propoxymethyl, etc.
  (b) aryloxyalkyl e.g., phenoxyethyl, naphthoxymethyl, phenoxypentyl, etc.,
  (c) aminoalkyl, e.g., aminobutyl, aminoethyl, aminopropyl, etc.,
  (d) hydroxyalkyl e.g., hydroxypropyl, hydroxyoctyl, hydroxymethyl, etc.,
  (e) aralkyl e.g., benzyl, phenethyl, etc., (f) alkylaminoalkyl e.g., methylaminopropyl, methylaminoethyl, etc., and also including dialkylaminoalkyl e.g., diethylaminoethyl, dimethylaminopropyl, propylaminooctyl, etc., (g) arylaminoalkyl, e.g., phenylaminoalkyl, diphenylaminoalkyl, N-phenyl-N-ethylaminopentyl, N-phenyl-N-ethylaminohexyl, naphthylaminoethyl, etc., (h) nitroalkyl, e.g., nitrobutyl, nitroethyl, nitropentyl, etc., (i) cyanoalkyl, e.g., cyanopropyl, cyanobutyl, cyanoethyl, etc., (j) haloalkyl, e.g., chloromethyl, bromopentyl, chlorooctyl, etc., (k) alkyl substituted with an acyl group having the formula

wherein R is hydroxy, hydrogen, aryl, e.g., phenyl, naphthyl, etc., lower alkyl having 1 to 8 carbon atoms e.g., methyl, ethyl, propyl, etc., amino including substituted amino e.g., diloweralkylamino, lower alkoxy having 1 to 8 carbon atoms e.g., butoxy, methoxy, etc., aryloxy e.g.;

(2) an aryl group, e.g., phenyl, naphthyl, anthryl, fluorenyl, etc., including a substituted aryl group such as (a) alkoxyaryl, e.g., ethoxyphenyl, methoxyphenyl, propoxynaphthyl, etc., (b) aryloxyaryl, e.g., phenoxyphenyl, naphthoxyphenyl, phenoxynaphthyl, etc., (c) aminoaryl, e.g., aminophenyl, aminonaphthyl, aminoanthryl, etc., (d) hydroxyaryl, e.g., hydroxyphenyl, hydroxynaphthyl, hydroxyanthryl, etc., (e) biphenylyl, (f) alkylaminoaryl, e.g., methylaminophenyl, methylaminonaphthyl, etc. and also including dialkylaminoaryl, e.g., diethylaminophenyl, dipropylaminophenyl, etc., (g) arylaminoaryl, e.g., phenylaminophenyl, diphenylaminophenyl, N-phenyl-N-ethylaminophenyl, N-phenyl-N-chloroaminophenyl, naphthylaminophenyl, etc., (h) nitroaryl e.g., nitrophenyl, nitronaphthyl, nitroanthryl, etc., (i) cyanoaryl, e.g., cyanophenyl, cyanonaphthyl, cyanoanthryl, etc., (j) haloaryl, e.g., chlorophenyl, bromophenyl, chloronaphthyl, etc., (k) aryl substituted with an acyl group having the formula

wherein R is hydroxy, hydrogen, aryl, e.g., phenyl, naphthyl, etc., amino including substituted amino, e.g., diloweralkylamino, lower alkoxy having 1 to 8 carbon atoms, e.g., butoxy, methoxy, etc., aryloxy, e.g., phenoxy, naphthoxy, etc., lower alkyl having 1 to 8 carbon atoms, e.g., methyl, ethyl, propyl, butyl, etc., (1) alkaryl, e.g., tolyl, ethylphenyl, propyl, naphthyl, etc.;

(3) a cycloalkyl group having 4 to 8 carbon atoms in the cyclic nucleus, e.g., cyclobutyl, cyclohexyl, cyclopentyl, etc., including a substituted cycloalkyl group such as (a) alkoxycycloalkyl e.g., ethoxycyclohexyl, methoxycyclobutyl, propoxycyclohexyl, etc., (b) aryloxycycloalkyl, e.g., phenoxycyclohexyl, naphthoxycyclohexyl, phenoxycyclopentyl, etc., (c) aminocycloalkyl, e.g., aminocyclobutyl, aminocyclohexyl, aminocycloopentyl, etc., (d) hydroxycycloalkyl e.g., hydroxycyclohexyl, hydroxycyclopentyl, hydroxycyclobutyl, etc., (e) arylcycloalkyl, e.g., phenylcyclohexyl, phenylcyclobutyl, etc., (f) alkylaminocycloalkyl e.g., methylaminocyclohexyl, methylaminocyclopentyl, etc. and also including dialkylaminocycloalkyl, e.g., diethylaminocyclohexyl, dimethylaminocyclobutyl, dipropylaminocyclooctyl, etc., (g) arylaminocycloalkyl, e.g., phenylaminocyclohexyl, diphenylaminocyclohexyl, N-phenyl-N-ethylaminocyclopentyl, N-phenyl-N-methylaminocyclohexyl, naphthylaminocyclopentyl, etc., (h) nitrocycloalkyl, e.g., nitrocyclobutyl, nitrocyclohexyl, nitrocyclopentyl, etc., (i) cyanocycloalkyl, e.g., cyanocyclohexyl, cyanocyclobutyl, cyanocyclopentyl, etc., (j) halocycloalkyl e.g., chlorocyclohexyl, bromocyclopentyl, chlorocyclooctyl, etc., (k) cycloalkyl substituted with an acyl group having the formula

wherein R is hydroxy, hydrogen, aryl, e.g., phenyl, naphthyl, etc., amino including substituted amino e.g., diloweralkylamino, loweralkoxy having 1 to 8 carbon atoms e.g., butoxy, methoxy, etc., aryloxy e.g., phenoxy, naphthoxy, etc., lower alkyl having 1 to 8 carbon atoms e.g., methyl, ethyl, propyl, butyl, etc.;

(4) a heterocyclic group including a substituted heterocyclic group containing 5 to 6 members in the heteronucleus and including at least one sulfur, selenium, oxygen or nitrogen atom such as thienyl group e.g., a benzothienyl group, a pyrrolyl group, e.g., a nitropyrrolyl group, a pyrrolidinyl group, e.g., a pyrrolyl group, a pyrrolinyl group, a benzopyrrolyl group, e.g., an indolyl group, a carbazolyl group, a furyl group, e.g., a furfuryl group, a benzofuryl group, etc., a pyridyl group, e.g., a halopyridyl group, an aminopyridyl group, a hydroxypyridyl group, an alkylpyridyl group, a nitropyridyl group, etc., a piperidyl group, a quinolyl group, an acridinyl group, a puranyl group, a benzopyranyl group, a pyrazolyl group, an oxazolyl group, a thiazolyl group, etc., (5) hydrogen; or (6) an alkenyl group having 2 to 10 carbon atoms, e.g., vinyl, propenyl, butenyl, pentenyl, etc., including a substituted alkenyl group such as (a) alkoxyalkenyl (b) aryloxyalkenyl (c) aminoalkenyl (d) hydroxyalkenyl
(e) aralkenyl e.g. styryl
(f) alkylaminoalkenyl
(g) arylaminoalkenyl
(h) nitroalkenyl
(i) cyanoalkenyl or
(j) haloalkenyl.

Preferred polymeric materials having polar domain groups are characterized by the following structure:

wherein: D, E and G are each any of the following:

(1) an alkyl group having 1 to 18 carbon atoms e.g., methyl, ethyl, propyl, butyl, isobutyl, octyl, dodecyl, etc. including a substituted alkyl group having 1 to 18 carbon atoms such as
  (a) alkoxyalkyl e.g. ethoxypropyl, methoxybutyl, propoxymethyl, etc.,
  (b) aryloxyalkyl e.g., phenoxyethyl, naphthoxymethyl, phenoxypentyl, etc.,
  (c) aminoalkyl, e.g., aminobutyl, aminoethyl, aminopropyl, etc.,
  (d) hydroxyalkyl e.g., hydroxypropyl, hydroxyoctyl, hydroxymethyl, etc.,
  (e) aralkyl e.g., benzyl, phenethyl, etc.,
  (f) alkylaminoalkyl e.g., methylaminopropyl, methylaminoethyl, etc., and also including dialkylaminoalkyl e.g., diethylaminoethyl, dimethylaminopropyl, propylaminooctyl, etc.,
  (g) arylaminoalkyl, e.g., phenylaminoalkyl, diphenylaminoalkyl, N-phenyl-N-ethylaminopentyl, N-phenyl-N-ethylaminohexyl, naphthylaminoethyl, etc.,
  (h) nitroalkyl, e.g., nitrobutyl, nitroethyl, nitropentyl, etc.,
  (i) cyanoalkyl, e.g., cyanopropyl, cyanobutyl, cyanoethyl, etc.,
  (j) haloalkyl, e.g., chloromethyl, bromopentyl, chlorooctyl, etc.,
  (k) alkyl substituted with an acyl group having the formula

wherein R is hydroxy, hydrogen, aryl, e.g., phenyl, naphthyl, etc., lower alkyl having 1 to 8 carbon atoms e.g., methyl ethyl, propyl, etc., amino including substituted amino e.g., diloweralkylamino, lower alkoxy having 1 to 8 carbon atoms e.g., butoxy, methoxy, etc., aryloxy e.g.;

(2) an aryl group, e.g., phenyl, naphthyl, anthryl, fluorenyl, etc., including a substituted aryl group such as
  (a) alkoxyaryl, e.g., ethoxyphenyl, methoxyphenyl, propoxynaphthyl, etc.,
  (b) aryloxyaryl, e.g., phenoxyphenyl, naphthoxyphenyl, phenoxynaphthyl, etc.,
  (c) aminoaryl, e.g., aminophenyl, aminonaphthyl, aminoanthryl, etc.,
  (d) hydroxyaryl, e.g., hydroxyphenyl, hydroxynaphthyl, hydroxyanthryl, etc.,
  (e) biphenylyl,
  (f) alkylaminoaryl, e.g., methylaminophenyl, methylaminonaphthyl, etc. and also including dialkylaminoaryl, e.g., diethylaminophenyl, dipropylaminophenyl, etc.,
  (g) arylaminoaryl, e.g., phenylaminophenyl, diphenylaminophenyl, N-phenyl-N-ethylaminophenyl, N-phenyl-N-chloroaminophenyl, naphthylaminophenyl, etc.,
  (h) nitroaryl, e.g., nitrophenyl, nitronaphthyl, nitroanthryl, etc.,
  (i) cyanoaryl, e.g., cyanophenyl, cyanonaphthyl, cyanoanthryl, etc.,
  (j) haloaryl, e.g., chlorophenyl, bromophenyl, chloronaphthyl, etc.,
  (k) aryl substituted with an acyl group having the formula

wherein R is hydroxy, hydrogen, aryl, e.g., phenyl, naphthyl, etc., amino including substituted amino, e.g., diloweralkylamino, lower alkoxy having 1 to 8 carbon atoms, e.g., butoxy, methoxy, etc., aryloxy, e.g., phenoxy, naphthoxy, etc., lower alkyl having 1 to 8 carbon atoms, e.g., methyl, ethyl, propyl, butyl, etc.,
  (1) alkaryl, e.g., tolyl, ethylphenyl, propyl, naphthyl, etc.;

(3) a cycloalkyl group having 4 to 8 carbon atoms in the cyclic nucleus, e.g., cyclobutyl, cyclohexyl, cyclopentyl, etc., including a substituted cycoalkyl group such as
  (a) alkoxycycloalkyl e.g., ethoxycyclohexyl, methoxycyclobutyl, propoxycyclohexyl, etc.,
  (b) aryloxycycloalkyl, e.g., phenoxycyclohexyl, naphthoxycyclohexyl, phenoxycyclopentyl, etc.,
  (c) aminocycloalkyl, e.g., aminocyclobutyl, aminocyclohexyl, aminocyclopentyl, etc.,
  (d) hydroxycycloalkyl e.g., hydroxycyclohexyl, hydroxycyclopentyl, hydroxycyclobutyl, etc.,
  (e) arylcycloalkyl, e.g., phenylcyclohexyl, phenylcyclobutyl, etc.,
  (f) alkylaminocycloalkyl e.g., methylaminocyclohexyl, methylaminocyclopentyl, etc. and also including dialkylaminocycloalkyl, e.g., diethylaminocyclohexyl, dimethylaminocyclobutyl, dipropylaminocyclooctyl, etc.,
  (g) arylaminocycloalkyl, e.g., phenylaminocyclohexyl, diphenylaminocyclohexyl, N-phenyl-N-ethylaminocyclopentyl, N-phenyl-N-methylaminocyclohexyl, naphthylaminocyclopentyl, etc.,
  (h) nitrocycloalkyl, e.g., nitrocyclobutyl, nitrocyclohexyl, nitrocyclopentyl, etc.,
  (i) cyanocycloalkyl, e.g., cyanocyclohexyl, cyanocyclobutyl, cyanocyclopentyl, etc.,
  (j) halocycloalkyl, e.g., chlorocyclohexyl, bromocyclopentyl, chlorocyclooctyl, etc.,
  (k) cycloalkyl substituted with an acyl group having the formula

wherein R is hydroxy, hydrogen, aryl, e.g., phenyl, naphthyl, etc., amino including substituted amino e.g., diloweralkylamino, loweralkoxy having 1 to 8 carbon atoms e.g., butoxy, methoxy, etc., aryloxy, e.g., phenoxy, naphthoxy, etc., lower alkyl having 1 to 8 carbon atoms e.g., methyl, ethyl, propyl, butyl, etc.;

(4) a heterocyclic group including a substituted heterocyclic group containing 5 to 6 members in the heteronucleus and including at least one sulfur, selenium, oxygen or nitrogen atom such as thienyl group e.g., a benzothienyl group, a pyrrolyl group, e.g., a nitropyrrolyl group, a pyrrolidinyl group, e.g., a pyrrolyl group, a pyrrolinyl group, a benzopyrrolyl group, e.g., an indolyl group, a carbazolyl group, a furyl group, e.g., a furfuryl group, a benzofuryl group, etc., a pyridyl group, e.g., a halopyridyl group, an aminopyridyl group, a hydroxypyridyl group, an alkylpyridyl group, a nitropyridyl group, etc., a piperidyl group, a quinolyl group, an acridinyl group, a pyranyl group, a benzopyranyl group, a pyrazolyl group, an oxazolyl group, a thiazolyl group, etc., (5) hydrogen; or (6) a nitrile group The molecular weight of the polar domain containing polymer is not critical so long as the polymer is present in the composition in the quantities previously specified. The material may range from simple dimers and trimers to intermediate molecular weight liquids to high molecular weight solid polymers.

Exemplary polar domain containing materials are set forth in Table A

TABLE A acetonitrile
propionitrile
butyronitrile
oleonitrile
valeronitrile
2-naphthonitrile
benzonitrile
isophthalonitrile
glycinonitrile
2-aminopropionitrile
2-amino-4-methylvaleronitrile
1,3,5-pentanetricarbonitrile
5-pyrimidinecarbonitrile
1,4-cyclohexanedicarbonitrile
4-morpholineacetonitrile
4-pyridineacrylonitrile
2-cyano-3-heptenoic acid
2-cyanoacetamide
2-cyanopropionyl chloride
p-cyanobenzaldehyde
N-cyanomethylphthalimide
2-hydroxybutyronitrile
hexanenitrile
3-butenenitrile
dodecanedinitrile
methacrylonitrile
cyclobutylnitrile
hydrogen cyanide
acrylonitrile
nicotinonitrile
succinonitrile
polyacrylonitrile
poly (methacrylonitrile)
poly (benzacrylonitrile)
poly(cyclobutylacrylonitrile)
poly(pyridylacrylonitrile)
poly(4-pyridineacrylonitrile)
poly(cyanoacrylonitrile)
poly(crotononitrile)
poly(oleonitrile)

blends, block, graft and copolymers with other vinyl polymers, condensation polymers, silicone polymers and natural resins such as those set forth under I, II, III and IV below.

Thermoplastic polymers having dissipation factors of less than 0.01 are made responsive to electromagnetic field energy according to this invention by the addition of polar domain containing compounds as described above. Typical thermoplastic polymers useful in this invention are:

I. Vinyl polymers including:

A. Polyolefins derived from alkene monomers such as ethylene, propylene, butylene, isobutylene, pentylene and mixtures thereof including polyethylene, polypropylene, polyisobutylene, polypentene, etc. and copolymers containing alkene monomers including copolymers of ethylene and propylene, ethylene and butylene, propylene and butylene, terpolymers of ethylene, propylene, butylene, etc.;

B. Polydiolefins derived from alkadienes such as butadiene, pentadiene, isoprene, chloroprene, including polybutadiene, polyisoprene, polychloroprene and also copolymers containing diolefins such as synthetic rubbers including SBR, butyl rubbers, nitrile rubbers, butadiene-acrylic acid rubbers, chlorinated rubbers;

C. Styrene polymers including substituted styrene polymers, halogen-substituted styrene polymers, alkyl-substituted styrene polymers, copolymers of styrene with other vinyl monomers, olefins and diolefins, ABS polymers, etc.;

D. Acrylic polymers such as poly(alkyl methacrylate), polyacrylonitrile, poly(acrylic acid), poly(methacrylic acid), polyacrylamide, copolymers of vinyl monomers with alkyl methacrylates, etc.;

E. Poly(vinyl esters) such as poly(vinyl acetate);

F. Poly(vinyl alcohol)

G. Poly(vinyl acetals) such as poly(vinyl formal), poly(vinyl butyral), etc.;

H. Chlorine containing polymers such as poly(vinyl chloride);

I. Poly(vinyl amines) such as poly(vinyl carbazoles), poly(vinyl pyrrolidones), poly(vinyl oxazolidinones), etc.;

J. Poly(vinyl ethers);

K. Poly(vinyl ketones);

L. Fluorocarbon polymers such as polytetrafluoroethylene, poly(vinyl fluoride), poly(vinylidene fluoride), vinylidene fluoride-hexafluoropropylene copolymers, tetrafluorethylenehexafluoropropylene copolymers, polychlorotrifluoroethylene, etc.;

II. Condensation polymers including polyamides, polyesters, polyurethane, polyethers, polycarbonates, phenolic resins, amino resins,, epoxy resins, etc.;

III. Silicone resins;

IV. Natural resins including cellulosic polymers, polypeptides, natural rubbers such as gutta-percha, balata, hevea, etc.;

V. Blends or admixtures of any of the above including an admixture of an acrylonitrile-styrene copolymer with an acrylontrilebutadiene-styrene terpolymer, an admixture of an acrylonitrile-styrene copolymer with a butadiene-methacrylonitrile copolymer, an admixture of an acrylonitrile-alpha methyl styrene copolymer with an acrylonitrile-butadiene-styrene terpolymer, an admixture of an acrylonitrile-alpha methyl styrene copolymer with a butadiene methacrylonitrile copolymer, etc.; Most thermoplastic polymers having a dissipation factor of less than 0.01 and practically all thermoplastic polymers having a dissipation factor of 0.009 or less do not respond to dielectric heating to a sufficient degree to render the polymers thermoformable. The incorporation of minor amounts of polar domain containing materials into the thermoplastic polymer lends to the polarity of the polymer and thus, increases the dissipation factor to a level where it becomes responsive to various types of dielectric heating. FIGS. 7 and 8 establish that increasing amounts of polar domain containing material in the thermoplastic polymer causes an increase in the dissipation factor of the polymeric composition. The specific polar domain employed is not critical so long as it contains at least one nitrile group, i.e., the relationship of FIGS. 7 and 8 are the same for all polar domain containing materials having at least one nitrile group. FIGS. 5 and 6 show that as the dissipation factor increases, the responsiveness of the thermoplastic polymer to dielectric heating also increases.

The portion of electromagnetic field energy converted to thermal energy, due to induced motions of the polar domains (groups) is a measure of dissipation factor.

Table B also shows in tabular form that small increases in the amount of polar domain containing material creates increases in the dissipation factor.

TABLE B

| THERMOPLASTIC POLYMER | TRADE NAME "BI-COLENE" | POLAR DOMAIN VOL % | DISSIPATION FACTOR |
|---|---|---|---|
| Polyethylene | Conventional | 0 | <0.0035 |
| " | CB | 2 | 0.014 |
| " | CT | 3 | 0.0155 |
| " | CC | 5 | 0.022 |
| " | CA | 9.15 | 0.039 |
| " | CE | 13 | 0.0505 |
| " | CF | 17.3 | 0.0650 |
| Polystyrene | Hi-Impact | 0 | <0.0034 |
| " | HD | 1 | 0.00945 |
| " | HB | 2 | 0.0142 |
| " | HT | 3 | 0.0335 |
| " | HC | 5 | 0.0415 |
| Polypropylene | Conventional | 0 | <0.0035 |
| " | PB | 2 | 0.0147 |
| " | PC | 5 | 0.0283 |
| " | PBZ | 2 | 0.0154 |

The addition of the polar domain containing materials described herein to those thermoplastic polymers which are responsive to dielectric heating (i.e. those polymers having dissipation factors greater than 0.009 or 0.01) increases their responsiveness so that they may be heated much more rapidly when exposed to electromagnetic field energy. This feature is economically advantageous in that cycle times are reduced leading to faster and cheaper productivity.

According to another aspect of the invention, a process for dielectrically heating thermoplastic sheeting in thicknesses greater than 0.05 inches, having a dissipation factor greater than 0.003 is accomplished by placing unheated sheets of thermoplastic and carrier release agent at one end of a stack of pairs of thermoplastic sheet and carrier-release agent, and removing a heated sheet and carrier-release agent from the other end of the stack of pairs of thermoplastic sheet and carrier-release agent, during each cycle of operation, each cycle including heating of the entire stack by radio frequency heating.

Those skilled in the art of radio frequency heating equipment and its use with materials having a high dielectric loss factor recognize that the energy absorbed by the material being heated depends upon its specific heat, its mass, and the temperature range through which the material is heated. In terms of the heat equation $Q = mc\Delta t$, Q represents the energy; m the mass; c the specific heat and $\Delta t$ is the temperature differential through which the material is heated. This can be related to the electrical energy consumed by the radio frequency heating equipment. Knowledge of the plate current and the plate voltage, considered at 'no load' and at operating conditions enables the power requirements for the dielectric material being heated to be calculated when the time of heating is noted. Neglecting thermal losses due to radiation and conduction of the material being heated, the relationship between the Btu's absorbed thermally and the power consumed electronically is:

$$\frac{mc\Delta t}{HR} = \text{Plate voltage} \times \text{(load-no load) current}$$

By using the conversion factor of 3415 (BTU/HR) = 1 kw. the amount of electronic energy, in the form of radio frequency energy required to process a predetermined weight of plastic per hour, can be calculated.

The quantity of heat that can be absorbed per unit time per pound of material influences the kilowatt rating of the radio frequency unit required to heat a specific amount of material per hour. Certain materials having a relative low 'loss factor' absorb energy at relatively slow rates, and the radio frequency energy ratings of the dielectric heating units can be quite low; using larger equipment only results in the equipment operating at a fraction of its rated capacity. For optimum operating conditions equipment should be run close to its rated capacity since the 'no load' consumption can be a substantial fraction of the 'operating load' where equipment is run substantially below its rated capacity.

With materials having low loss factor the time factor must be increased to enable sufficient energy to be absorbed per pound of material being heated. This is usually accomplished by increasing the dwell time in a fixed plate radio frequency heating unit or employing multiple units in series. The instant disclosure sets forth methods for increasing heating time for material being heated continuously, or in semi-continuous sequences for both thin gauge and heavy material.

Increasing the heating time with materials having a low dissipation factor by the means described below is the subject of one embodiment of the instant disclosure. A preferred method of obtaining the same objective can be utilized, as described previously in another embodiment of the present invention, by modifying the dissipation factor to a higher value, thereby resulting in faster heating cycles.

The invention is further understood by considering the following accompanying drawings. In these drawings.

Figure 5:
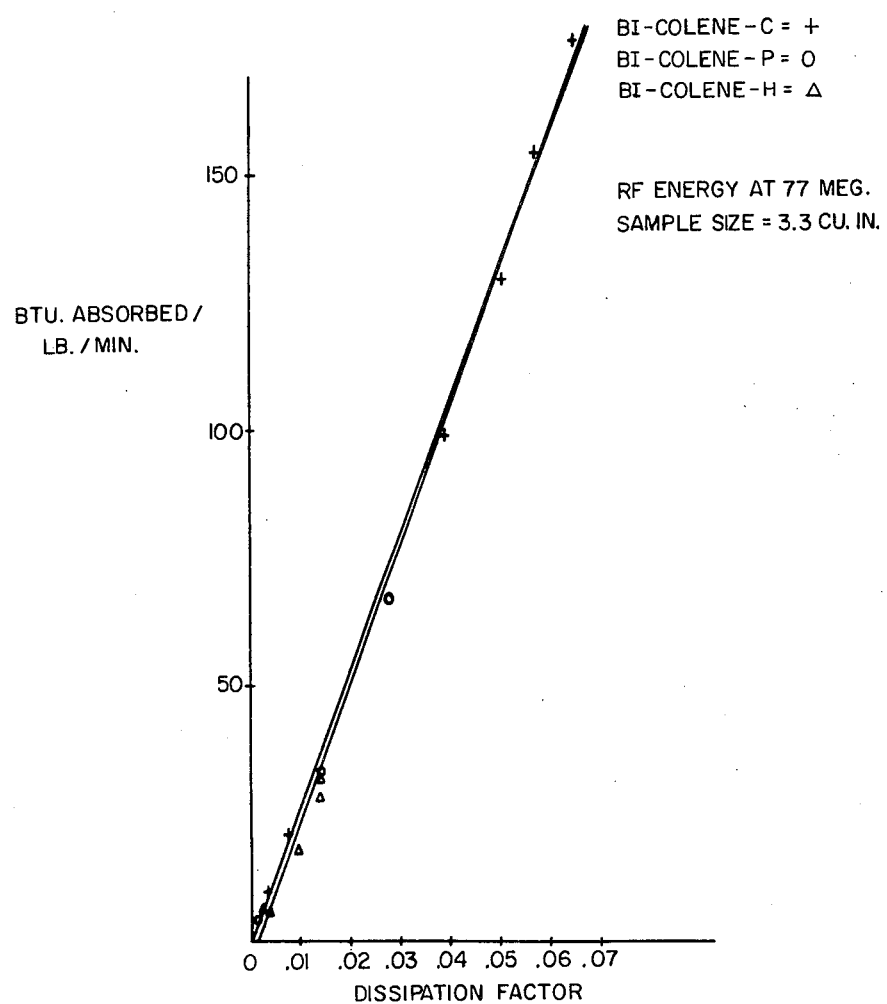

FIG. 5 indicates graphically the relationship between the energy absorbed and the dissipation factor of the resin under the conditions of radio frequency heating.

Figure 6:
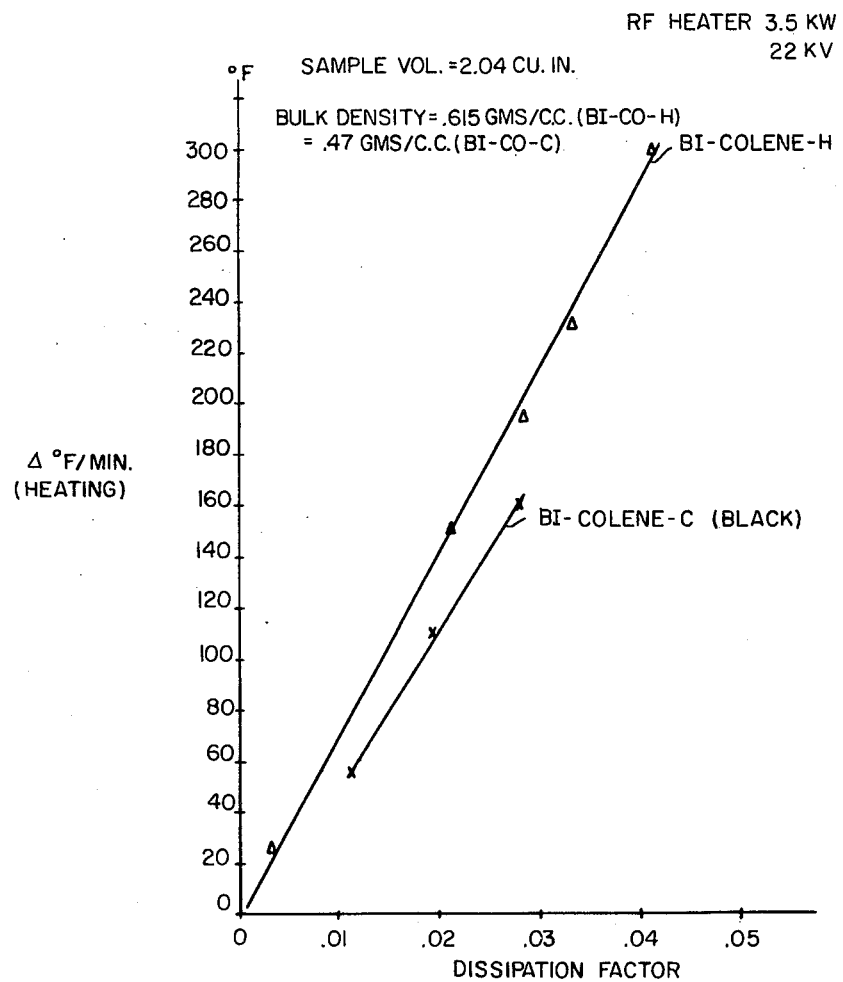

FIG. 6 indicates graphically the relationship between the rate of heating and the dissipation factor of the resin under the conditions of radio frequency heating.

Figure 7:
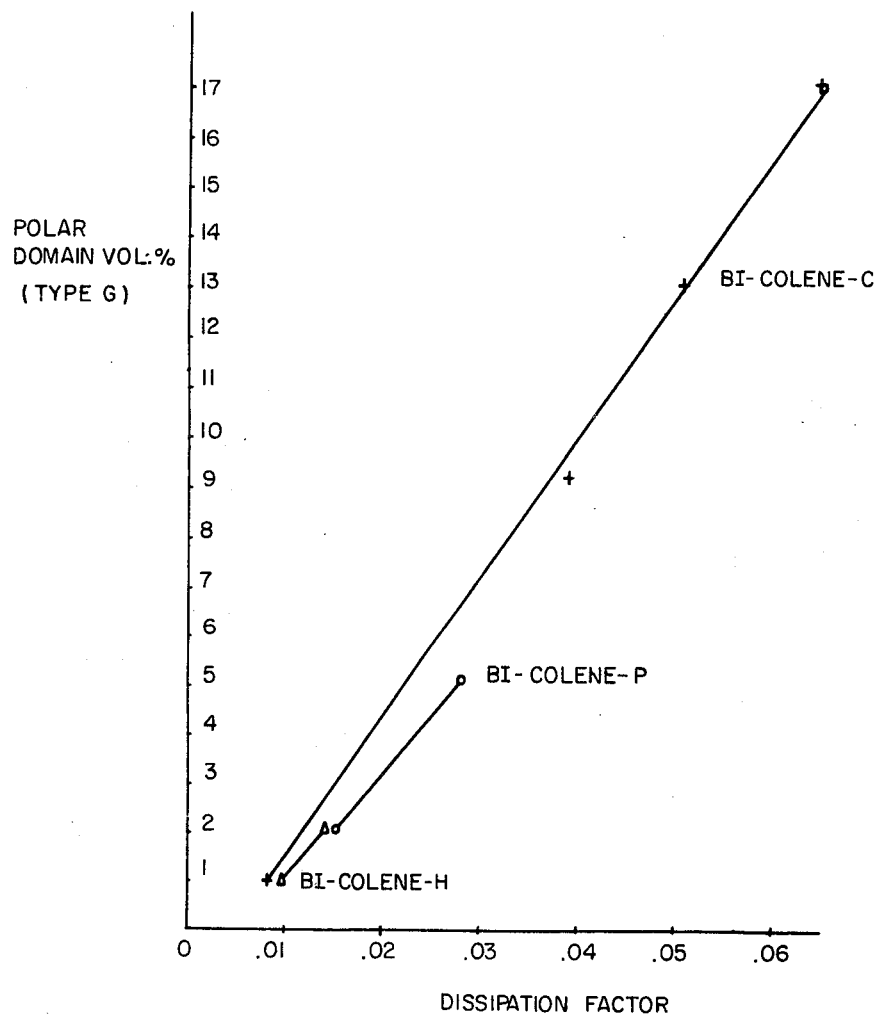

FIG. 7 indicates graphically the relationship of polar domain concentration versus its effect on the dissipation factor.

Figure 8:
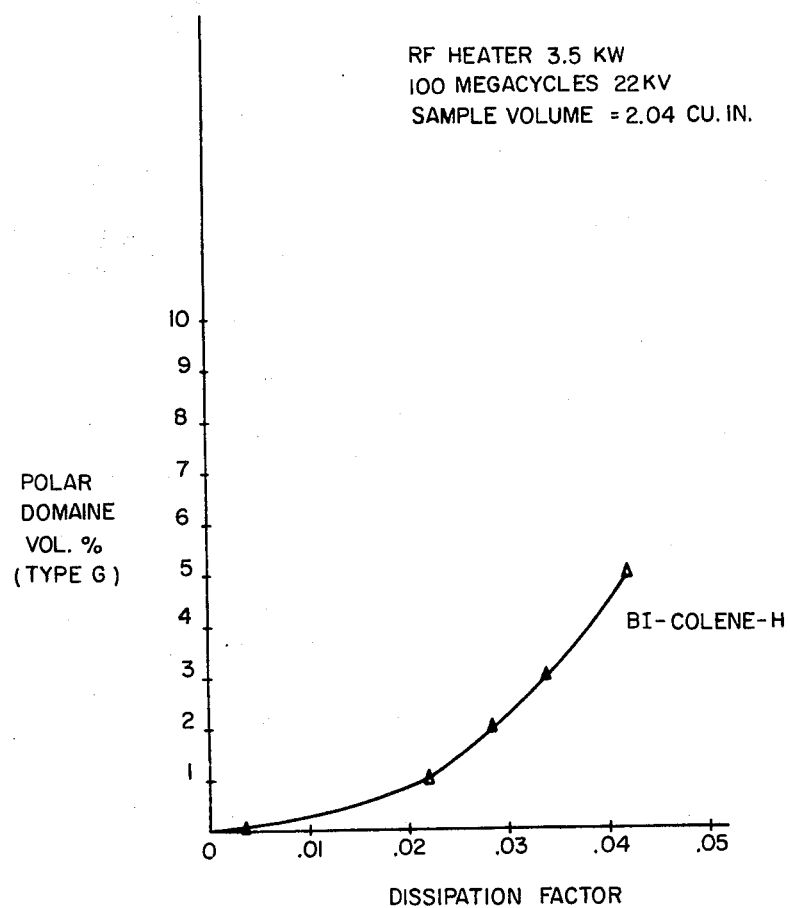

FIG. 8 is similar to FIG. 7 but for different radio frequency heating conditions.

Figure 9:
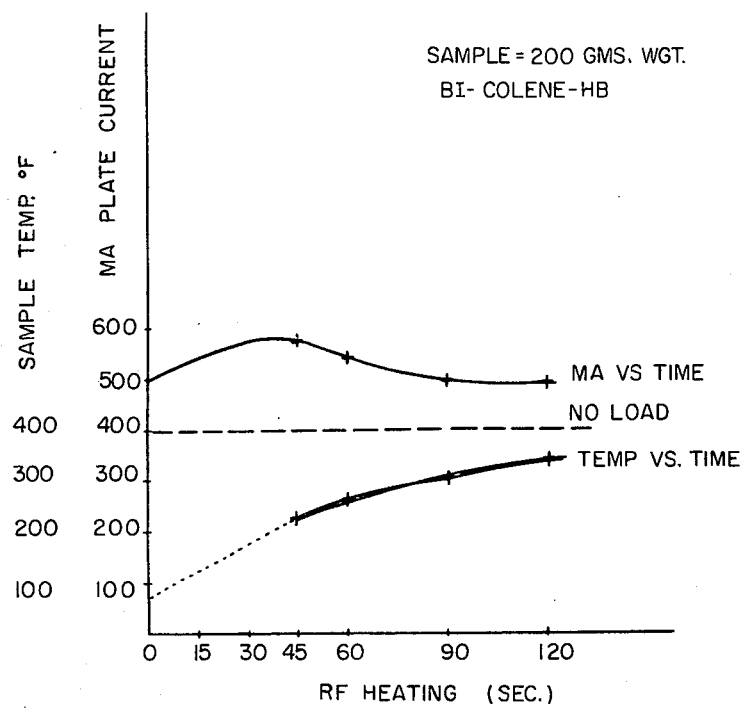

FIG. 9 indicates graphically the variations in power consumption as well as temperature with time during radio frequency heating.

Figure 1:
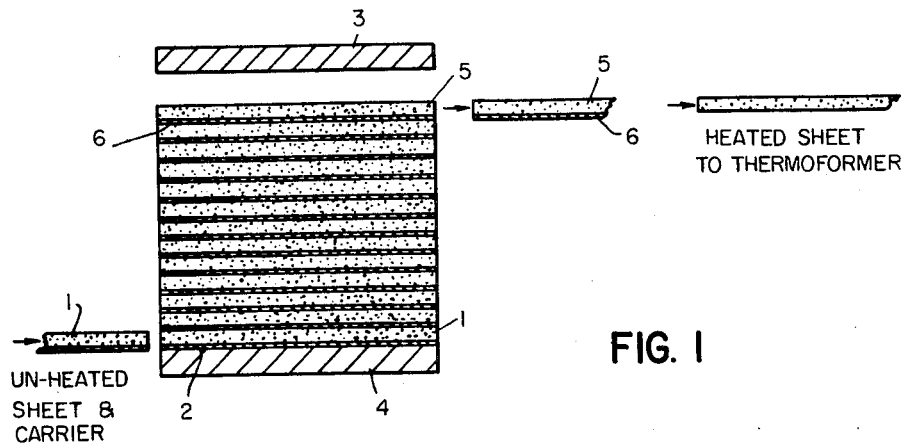
FIG. 1 shows the flow pattern of heavy gauge sheets in a fixed plate dielectric heater.

Referring to FIG. 1 and considering in greater detail, the heating of heavy gauge sheets of 0.060 to 0.500 inches and heavier by radio frequency heating—a thermoplastic sheet such as 1 to be thermoformed, which has a sufficiently high dissipation factor to respond to radio frequency heating is placed on a sheet 2 of release agent or carrier sheet employed in radio frequency heating units. The carrier sheet may be silicone rubber or Teflon which possesses the desirable properties of being a release agent and being unaffected by the temperatures normally encountered in heating of sheets for thermoforming operations. Any other material having these properties may be similarly employed. The stack of sheets of release agent and thermoplastic sheets to be radio frequency heated for thermoforming is lifted by suitable means, between the radio frequency electrodes, 3 and 4, and an unheated sheet of thermoplastic and its carrier is placed on the bottom electrode. The top sheet 5 and its carrier 6 are removed from the stack by suitable means. The carrier is separated from the heated sheet and is re-used with unheated sheets, while the heated sheet is fed into a thermoforming unit where it is formed into articles of commerce. The remainder of the stack is replaced on top of the unheated sheet and carrier, the top electrode is brought into operating position, if necessary, and radio frequency is applied. At timed intervals, corresponding to the thermoforming cycle employed for the sheets being radio frequency heated and thermoformed, the cycle of introducing a sheet and carrier, removing a sheet and carrier, and heating the stack, is repeated. The unheated sheet and carrier may be introduced at the top of the stack, and the heated sheets removed from the bottom of the stack during each cycle; however, since the unheated sheets are more rigid, it is preferred to introduce the unheated sheets at the bottom for greater ease of handling of the stack, as well as handling of the individual sets of sheet and carrier. The number of sets of sheet and carrier handled in a stack will depend on the temperature to which the sheets must be heated for thermoforming which in turn is dependent upon the type of plastic being heated, the time cycle of the thermoforming unit, the dielectric loss factor (dissipation factor) of the sheets, the power rating of the radio frequency unit, and other pertinent factors.

Where it is desired to avoid using release agents or carriers in the above process for heating sheets electronically, the stack may be heated to a temperature sufficiently below the fusion point to avoid blocking or fusion of one sheet to the next in one heating unit followed by heating of the hottest individual sheet to thermoforming temperatures in a second radio frequency heating unit or other type of thermoforming heating unit. This eliminates the need for handling and utilizing carriers. Most thermoplastic materials have a higher dissipation factor at elevated temperatures, therefore the heating time for the preheated individual sheets can be relatively short compared to the initial heating cycle of passing through the stack in the primary heating unit. By controlling the number of sheets in the primary stack, the time to heat the sheet in stacked form can be coordinated with the time to further heat the sheet individually in the secondary heating unit to prepare the sheet for thermoforming. Under optimum conditions the thermoforming cycle will equal each heating cycle so that a semi-continuous operation can be established with maximum production rates.

Figure 2:
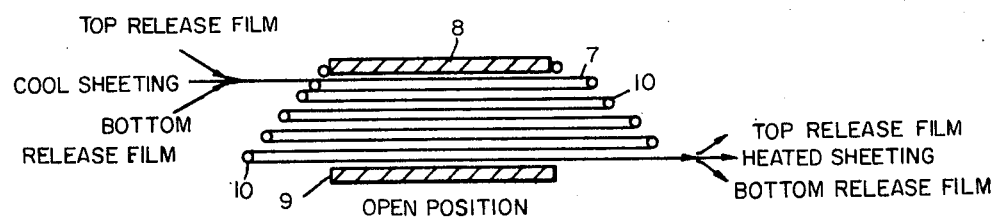
FIG. 2 shows the flow pattern of thin gauge film in a fixed plate dielectric heater.

Considering thin gauge sheeting of film which can be wound around rolls of small diameter and referring to FIG. 2, in order to increase the time of exposure of the thin sheets to radio frequency energy the web 7 is caused to pass back and forth in forward and reverse direction between the radio frequency electrodes 8 and 9. Rolls such as 10 over which the sheeting and its carrier films pass may be idler rolls or driven rolls and should be constructed of such material as to not affect the radio frequency field or absorb energy from the radio frequency field.

Figure 2A:
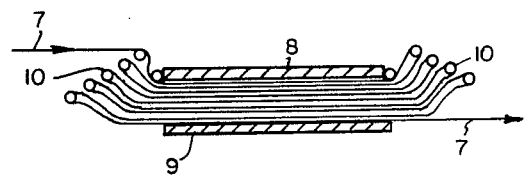
FIG. 2A shows the heater of FIG. 2 in a closed position.

With sufficiently high powered radio frequency units where the sheeting is passing between the electrodes at rapid speeds in a continuous manner, air gaps between the layers of sheeting (including the top and bottom transporting film) can be tolerated. Where maximum heating rates are required with radio frequency units of optimum rating for the application involved and where intermittent progress of sheeting through the radio frequency unit can be accommodated by the processing line, the two plates of the fixed plate radio frequency unit can be intermittently brought closer together as shown in FIG. 2A, and farther apart as shown in FIG. 2. When the two plates are in the open position (farther apart), the sheeting can be advanced a specific length, equal to the amount being thermoformed per cycle. The plates are then brought into closer proximity, compressing the sheets into a denser mass, thereby enabling the concentration of polar mass per unit volume between the plates to be increased to a practical maximum, which allows the radio frequency unit to convert the maximum amount of energy into heat within the thermoplastic material being heated. The time cycle for advancing a specified length and heating the multiple layers of thermoplastic sheeting should be adapted to the time cycle of the thermoforming unit operating in conjunction with the radio frequency heating unit.

As with the heavy gauge cut sheet operation described above, the total area of sheeting exposed to radio frequency heating and the rate at which it passes through the heating unit will depend on several factors, including the temperature to which the sheeting must be raised, the dissipation factor of the sheeting, the power rating of the radio frequency unit and other pertinent considerations related to the processing equipment and their time cycles.

The above described processing lines consider the thermoplastic material to be responsive to radio frequency energy. The carrier films or belts which serve as transport belts are usualy fabricated of material having a low dissipation factor and do not heat directly by radio frequency energy, but do absorb substantial energy by conduction and radiation from the thermoplastic being heated. Diverse means have been employed to reduce the loss by radiation and conduction from the heated thermoplastic to the transport belts including preheating of the transport belt and use of an insulated chamber to reduce losses from the transport belt to the surroundings. Such measures reduce the load on the radio frequency unit.

Figure 3A:
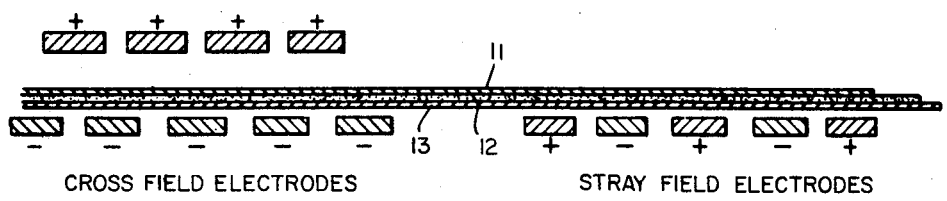
FIGS. 3A, 3B and 4 represent a continuous processing line, employing a belt of high loss factor moving in contact with non-polar webbing using stray-field heating.
Figure 3B:
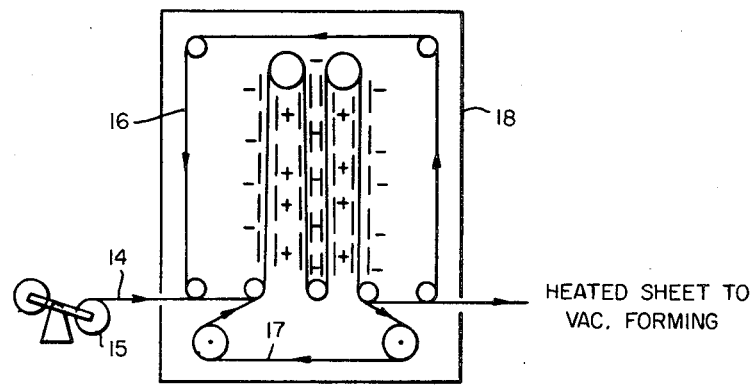
Figure 3C:
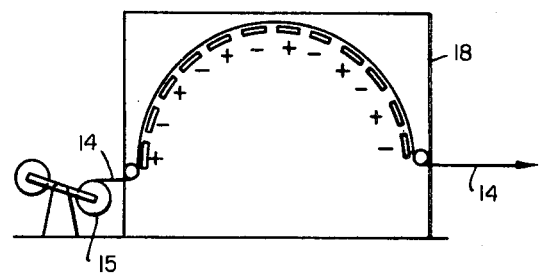
Figure 4:
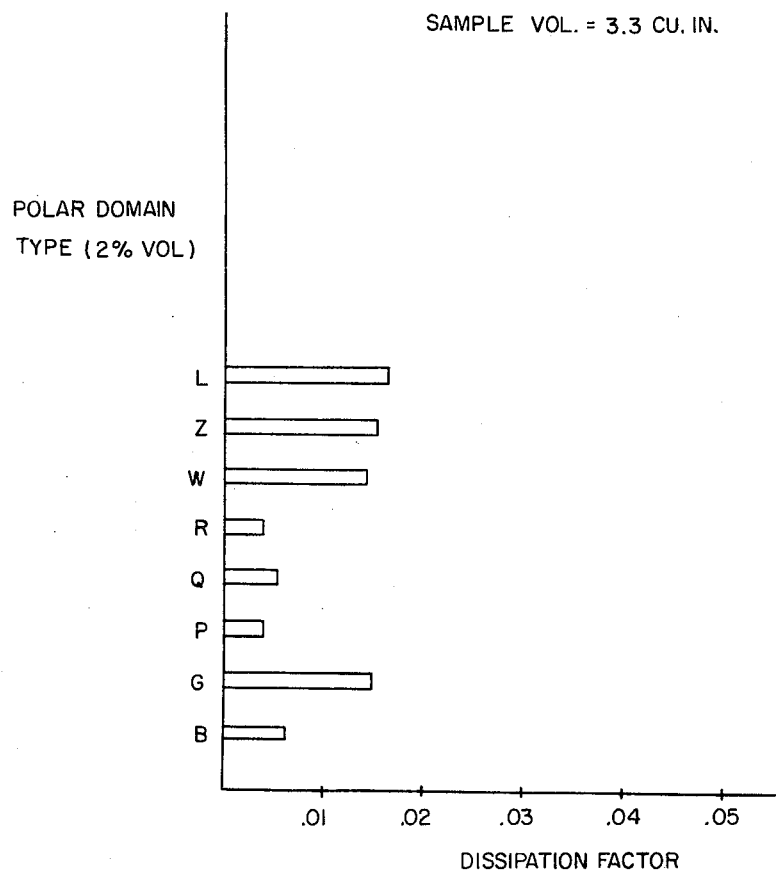

It is within the scope of the present disclosure to utilize transport belts 11 and 12 having a high dissipation factor so that they will be heated to a controlled degree at the same time as the polar thermoplastic is being heated. An example is shown in FIG. 3A. Used in conjunction with insulated chambers, loss by the radio frequency heated thermoplastic 13 by conduction and radiation to the transport belts, can be minimized or eliminated. In fact, by controlling the dissipation factor of the transport belts heat can be made to flow from the belt to the thermoplastic being heated, so that thermoplastics having a low dissipation factor can be heated indirectly by radio frequency energy by directly heating transport belts having a high dissipation factor and allowing thermal energy to flow from the transport belts to the thermoplastic by conduction and radiation. Processing may be done in a manner similar to that illustrated in FIG. 2 or 3A for thin gauge material. It should be noted that heavy gauge thermoplastic sheets of low dissipation factor (non-polar) may be indirectly heated by carrier sheets or plates having a high dissipation factor (polar materials) as described above using the processing as illustrated in FIG. 1. Other geometric patterns for the radio frequency electrodes are operable to produce a compact processing unit some of which are illustrated in FIG. 3B and FIG. 4. In 3B cross field electrodes are illustrated by the + and − signs while in 4 stary field electrodes are indicated.

Referring to FIG. 3B, plastic sheeting is unwound from an unwind roll, fed between two continuous belts 16 and 17 having release properties, as well as having sufficient dielectric loss to respond to high frequency radio energy. Th belts travel within an insulated chamber 18, so that they do not cool excessively while traveling in a continuous loop during continuous operation. The non-polar material being of thin gauge is heated by conduction and radiation. The rate of heating depends on the temperature of the transporting belts and the thermal energy stored in the belts, which in turn depends on its thickness, specific heat, and the thermal conductivity of the transporting belts. Properties of the non-polar material such as thickness, specific heat and thermal conductivity also contribute to the rate of heating of the non-polar material. The amount of heat absorbed will depend also on the time of contact between the two materials, which is dependent on the distance traveled in intimate contact of the two materials, as well as the velocity of travel. The temperature to which the non-polar material will be heated depends on the thermal energy transferred from the dielectrically heated transport belt to the non-polar material being heated as noted above.

While the reasons for the unexpected results of this invention are neither known or understood, it is theorized that each polar domain is surrounded by non-polar thermoplastic polymer. The polar domain containing material is readily heated dielectrically while the non-polar polymer is non-responsive. As the polar component is heated dielectrically, it creates a thermal differential between itself and the surrounding polymer. The rate of conduction of heat across the interface of the polar/non-polar material is proportional to the contiguous surface area, as well as the temperature differential. It is further theorized that the heated polar material radiates its energy to the surrounding non-polar material at a rate which is proportional to the temperature differential to the fourth power. Under ideal conditions the rate at which energy is absorbed by the polar groups when subjected to an electrical field is the same as the rate at which energy is transferred from the polar to the non-polar portions of the mass. The net effect is equivalent to heating of the entire mass uniformly by the radio frequency electric field even though the polymer is non-responsive. According to the theory, a disproportionately small mass of polar material is capable of heating a substantially larger mass of non-polar material while under the influence of an electrical field (radio frequency) in unexpectedly short time intervals.

The following examples are included for a further understanding of the invention.

Example 1

Polystyrene

A 2.04 cubic inch sample is prepared by blending high impact polystyrene with 2% by volume of acrylonitrile-butadiene elastomer of 35% to 40% acrylonitrile content such as the polar domain-containing material and placing it in dielectric heating equipment (3.5 KW and 22 KV). The admixture has a bulk density of 0.615 gms/cc. The sample is then exposed to 100 megacycles for 60 seconds. The temperature of the sample before heating is 80° F. and after heating is uniformly about 280° F., an increase of about 200° F. in 60 seconds. FIG. 9 shows the relationship of heating time versus temperature and plate current for this example.

Example 2

Polystyrene

Example 1 is repeated except the concentration by volume of the polar domain containing material is increased to 5%. The temperature of the sample increases uniformly throughout the material from 80° F. to over 400° F., and increase of more than 320° F.

Example 3-Control

Polystyrene

Example 1 is repeated except the polar domain containing material is omitted. After exposure for 60 seconds to 100 megacycles no practical increase is noted in the temperature of the sample.

Example 4

Polyethylene

A 3.3 cubic inch sample is prepared by blending polyethylene with 5% by volume of acrylonitrile-butadiene elastomer of 35% to 40% acrylonitrile content as the polar domain containing material and placing it in dielectric heating equipment (3.5 KW and 22 KV). The admixture has a bulk density of 0.40 gms/cc. The sample is then heated by exposing it to radio frequency energy at 77 megacycles for 60 seconds. The temperature of the sample before heating is 80° F. and after heating is uniformly about 200° F., an increase of about 120° F. in 60 seconds.

Example 5
Polyethylene

Example 4 is repeated except that the concentration by volume of the polar domain containing material is increased to 10% by volume. The temperature of the sample uniformly increases from 80° F. to 290° F., an increase of 210° F.

Example 6-Control
Polyethylene

Example 4 is repeated except the polar domain containing material is omitted. After exposure for 60 seconds to 77 megacycles, no practical increase is noted in the temperature of the sample.

Example 7
Polypropylene

A 3.3 cubic inch sample is prepared by blending polypropylene with 2% by volume of acrylonitrile-butadiene elastomer of 35% to 40% acrylonitrile content as the polar domain containing material, and placing it in dielectric heating equipment (3.5 KW and 22 KV). The admixture has a bulk density of 0.35 gms/cc. The sample is then heated by exposing it to radio frequency energy at 77 megacycles for 60 seconds. The temperature of the sample before heating is 80° F. and after heating is uniformly about 162° F., an increase of about 82° F. in 60 seconds.

Example 8
Polypropylene

Example 7 is repeated except the concentration by volume of the polar domain containing material is increased to 5% by volume. The temperature of the sample uniformly increases from 80° F. to 235° F., an increase of 155° F.

Example 9-Control
Polypropylene

Example 7 is repeated except the polar domain containing material is omitted. After exposure for 60 seconds to 77 megacycles, no practical increase is noted in the temperature of the sample.

Example 10-Control
ABS Resin

A 47 gram test sample is prepared by compounding an injection grade ABS (acrylonitrile-butadiene-styrene) polymer having a flow rate of 1.2 gms. in 10 minutes (ASTM D1238-65T) and manufactured by Marbon Chemical Co. with 1% titanium dioxide in a Banbury mixer, rolling the material into sheets of about ¼" thickness, disintegrating the sheets to granules and moulding the test specimen from the granules. The specimen is then placed in dielectric heating equipment (3.5 KW, 22,000 volts, 80–100 megacycles). A needle pyrometer is placed in the center of the sample and the temperature increase is noted as a function of time. After 60 seconds, the temperature of the specimen uniformly increased from 80° F. to 195° F., an increase of 115° F.

Example 11
ABS Resin

Example 10 is repeated except the test specimen includes 2% of acrylonitrile-butadiene elastomer of 35% to 40% acrylonitrile content as the polar domain containing material. After 60 seconds, the temperature of the specimen increased uniformly from 80° F. to above 400° F., an increase of over 320° F.

Example 12
ABS Resin

Example 11 is repeated except the test specimen includes 5% of acrylonitrile-butadiene elastomer of 35% to 40% acrylonitrile content as the polar domain containing material. After 45 seconds, the temperature of the specimen increased uniformly from 80° F. to above 400° F., an increase of more than 320° F.

Example 13

The blended material of Example 12 is rolled into sheets about 0.25 inch thickness and built up into a 5 ply stack 1.25 inches thick. Within 30 seconds after exposing the stock to radio frequency energy between 80 and 100 megacycles, the temperature reached 280° F. from an initial temperature of 80° F., an increase of 200° F. in 30 seconds.

Example 14

Example 2 is repeated using the various polar domain containing materials set forth in Table A. In each instance the temperature of the sample was substantially increased compared to similarly tested specimens which did not contain the polar domain additive.

As stated previously, the addition of the polar domain containing material has no detrimental effects on the physical properties of the product and in most instances improves the physical properties. Table C below compares the physical properties of the specimens described in Examples 10, 11 and 12.

TABLE C

| EXAMPLE NO. | POLAR DOMAIN (Vol. %) | TENSILE STRENGTH (p.s.i.) | ELONGATION (%) | IMPACT (ft lb/ in. notch) | FLOW RATE (g/10 min) |
|---|---|---|---|---|---|
| 10 | 0 | 5091 | 46 | 6.8 | 1.1 |
| 11 | 2 | 4978 | 36 | 6.96 | 1.2 |
| 12 | 5 | 4855 | 42 | 7.98 | 1.05 |

In accordance with the invention described herein, thermoplastic resins which are normally non-responsive to dielectric heating can be electronically heated to temperatures approaching or above the thermoforming and softening temperatures and fabricated into finished articles by various conversion techniques. They can be preheated electronically and moulded in compression, transfer or plunger moulding equipment, or forging operations. Also, they can be preheated electronically to reduce processing costs and increase production rates in extrusion and injection moulding equipment. The polar domain containing materials described herein can be incorporated in printing inks, baking enamels, plastisols and various Stage B resins to shorten drying or curing times of materials processed with radio frequency heating equipment.

The invention has been described in detail with particular reference to certain preferred embodiments thereof, but it will be understood that variations and modifications can be effected within the spirit and scope of the invention.

I claim:

1. A polymeric composition consisting essentially of
   (a) from about 80% to about 99% of a thermoplastic polymer selected from the group consisting of a polyethylene, a polypropylene, a copolymer of butadiene and styrene, a copolymer of ethylene and propylene, a polystyrene, a natural rubber, a polybutadiene, an admixture of an acrylonitrile-styrene copolymer with an acrylonitrile-butadiene-styrene terpolymer, and admixture of an acrylonitrile-styrene copolymer with a butadiene-methacrylonitrile copolymer, an admixture of an acrylonitrile-amethyl styrene copolymer with an acrylonitrile-butadiene-styrene terpolymer, an admixture of an acrylonitrile-amethyl styrene copolymer with a butadiene methacrylonitrile copolymer, a polysiloxane and a polyisobutylene, said polymer having a dissipation factor of less than 0.01 and
   (b) from about 1% to about 20% of a polar domain containing material selected from the group consisting of polyacrylonitrile and an acrylonitrile-butadiene copolymer, said material having a nitrile group content of at least 14.7%.

2. The composition of claim 1 wherein the thermoplastic polymer is polyethylene.

3. The composition of claim 1 wherein the thermoplastic polymer is polypropylene.

4. The composition of claim 1 wherein the thermoplastic polymer is a copolymer of butadiene and styrene.

5. The composition of claim 1 wherein the thermoplastic polymer is a copolymer of ethylene and propylene.

6. The composition of claim 1 wherein the thermoplastic is polystyrene.

7. The composition of claim 1 wherein the thermoplastic polymer is natural rubber.

8. The composition of claim 1 wherein the thermoplastic polymer is polybutadiene.

9. The composition of claim 1 wherein the thermoplastic polymer is polysiloxane.

10. The composition of claim 1 wherein the thermoplastic polymer is butyl rubber.

11. The composition of claim 1 wherein the thermoplastic polymer is an admixture of an acrylonitrile-styrene copolymer with an acrylonitrile-butadiene-styrene terpolymer.

12. The composition of claim 1 wherein the thermoplastic polymer is an admixture of an acrylonitrile-styrene copolymer with a butadiene-methacrylonitrile copolymer.

13. The composition of claim 1 wherein the thermoplastic polymer is an admixture of an acrylonitrile-amethyl styrene copolymer with an acrylonitrile-butadiene-styrene terpolymer.

14. The composition of claim 1 wherein the thermoplastic polymer is an admixture of an acrylonitrile-amethyl styrene copolymer with a butadiene-methacrylonitrile copolymer.

15. A thermoplastic polymeric composition consisting essentially of from about 80% to 99% of polyethylene having a dissipation factor of less than 0.01 and from about 1% to about 20% of acrytonitrile-butadiene copolymer having a nitrile group content of at least 14.7%.

16. A process for increasing the dissipation factor of a thermoplastic polymer having a dissipation factor of less than 0.01 consisting of adding thereto from 1% to 20% by weight of the total composition, a polymeric polar domain containing material having a nitrile group content of at least 14.7%.

17. The process of claim 16 wherein the thermoplastic polymer is selected from the group consisting of a vinyl polymer, a condensation polymer, a silicone resin and a natural resin.

18. The process of claim 16 wherein the thermoplastic polymer is polyethylene.

19. The process of claim 16 wherein the thermoplastic polymer is polypropylene.

20. The process of claim 16 wherein the thermoplastic polymer is polystyrene.

* * * * *